C. F. Woodruff,
Ditcher.

No. 100,231. Patented Feb. 22. 1870.

Witnesses:
Victor Hagmann
Chas. H. Pettit

Inventor:
C. F. Woodruff
per Munn & Co.
Attorneys.

UNITED STATES PATENT OFFICE.

C. F. WOODRUFF, OF NEWBERN, TENNESSEE.

IMPROVEMENT IN DITCHERS.

Specification forming part of Letters Patent No. 100,231, dated February 22, 1870.

*To all whom it may concern:*

Be it known that I, C. F. WOODRUFF, of Newbern, in the county of Dyer and State of Tennessee, have invented a new and useful Improvement in Ditchers; and I do hereby declare that the following is a full, clear, and exact description of the construction and operation of the same, reference being had to the accompanying drawings, making a part of this specification, in which—

Figure 1:
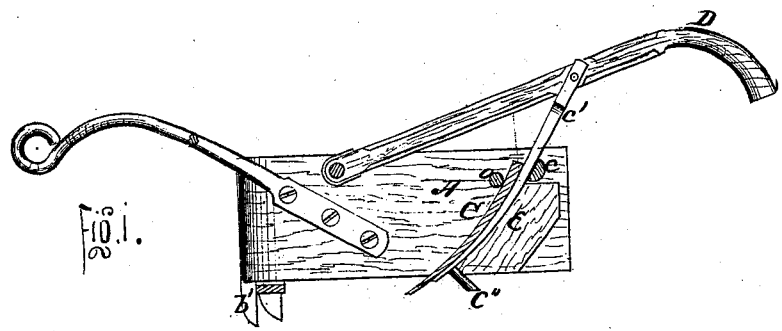
Figure 2:
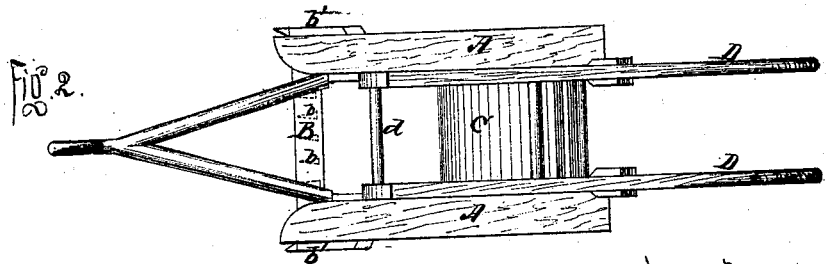

Figure 1 is a front elevation, and Fig. 2 is a longitudinal central vertical section.

This invention relates to a ditcher having two parallel side pieces, with a front cutter and a rear sliding scraper.

The invention consists in providing the rear sliding scraper with a guideway for regulating its movements, and guards to prevent its being forced back, and pins to prevent its being lifted out of the frame.

In the drawings, A A are the side pieces or planks, which are sharpened off at their front ends.

B is the front cutter, passed across the planks A at their lower front corner, having its ends turned up and fastened to the outside of the planks, and thus connecting and bracing them. From the under side of the front cutter project downward sharp blades $b\ b$, sufficient in number to loosen the soil through which they are drawn. To the outside of the side pieces, at their front ends and just in advance of the turned-up ends of the cutter B, are secured the side blades, $b'$, for the purpose of forming the sides of the ditch. The soil thus cut and loosened is taken up by the rear scraper, C, which slides vertically between a pair of bars, $c\ c$, having their ends secured in the side planks. Said rods guide the scraper in its movements, bars $c'\ c'$ projecting upward from the rear of the scraper, and at its edges have sockets in their upper ends to receive the handles D D, the forward extremities of which are pivoted upon the cross-bar $d$. The handles and scraper may be elevated at any time to discharge the load or for any other purpose. On elevating them, lest the scrapers by mischance should be withdrawn entirely from between the guide-bars $c$, pins $c''\ c''$ project from its rear side, which strike the rear guide-bar when sufficiently lifted. Metal plates E E are fastened to the inside of the plank A just in rear of the scraper, with front edges conforming to the curve of the latter, so as to support it against the shocks it is subject to from the material in front.

The cheapness, simplicity, and durability of this machine are apparent.

Having thus described my invention, what I claim as new, and desire to secure by Letters Patent, is—

The guide-rods $c$, guards $e$, and pins $c''$, combined and arranged substantially as described.

C. F. WOODRUFF.

Witnesses:
W. T. WESSON,
J. S. FIELD.